United States Patent
Niwa et al.

(10) Patent No.: US 6,460,083 B1
(45) Date of Patent: Oct. 1, 2002

(54) COMMUNICATION SYSTEM FOR SELECTIVELY CONNECTING A SERVER TO NUMEROUS TERMINAL UNITS OVER A PUBLIC NETWORK

(75) Inventors: Yushi Niwa, Osaka; Hidehiro Matsumoto, Tokyo, both of (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/182,359

(22) Filed: Oct. 29, 1998

(30) Foreign Application Priority Data

Nov. 4, 1997 (JP) .............................. 9-301886

(51) Int. Cl.[7] .............................................. G06F 15/16
(52) U.S. Cl. ..................... 709/227; 709/200; 709/203; 709/217; 709/219; 709/228
(58) Field of Search ................. 709/201–203, 709/204–205, 217–219, 227–228, 238, 242; 374/93.14, 93.17, 201, 207, 220, 230; 713/200–201, 152–154

(56) References Cited

U.S. PATENT DOCUMENTS

| | | | |
|---|---|---|---|
| 5,369,686 A | 11/1994 | Dutra et al. | 379/94 |
| 5,701,412 A * | 12/1997 | Takeda et al. | 709/227 |
| 5,835,724 A * | 11/1998 | Smith | 709/227 |
| 5,941,955 A * | 8/1999 | Wilby et al. | 709/242 |
| 6,014,687 A * | 1/2000 | Watanabe et al. | 709/204 |
| 6,078,583 A * | 6/2000 | Takahara et al. | 370/356 |
| 6,298,372 B1 * | 10/2001 | Yoshikawa | 709/200 |
| 6,321,250 B1 * | 11/2001 | Knape et al. | 709/203 |

FOREIGN PATENT DOCUMENTS

| | | |
|---|---|---|
| EP | 0798899 | 10/1997 |
| EP | 0812100 | 12/1997 |
| JP | 1-65953 | 3/1989 |
| JP | 1162056 | 6/1989 |
| JP | 3-88469 | 4/1991 |
| JP | 3174847 | 7/1991 |
| JP | 4362826 | 12/1992 |

OTHER PUBLICATIONS

European Search Report (in English) issued May 3, 2000 in a related application.

* cited by examiner

*Primary Examiner*—Bharat Barot
(74) *Attorney, Agent, or Firm*—Dickstein, Shapiro, Morin & Oshinsky, LLP

(57) ABSTRACT

A communication system of a network includes a server having a table in which clients and telephone numbers are stored in a paired relationship in advance, and the server refers to the table to originate a telephone call to an object client who, upon receiving a data information request, accesses the server. After the information data request is confirmed and the client disconnects a modem line temporarily, the client then originates a telephone call to the server to access the server and to accept communication data from the server.

16 Claims, 13 Drawing Sheets

Fig. 2
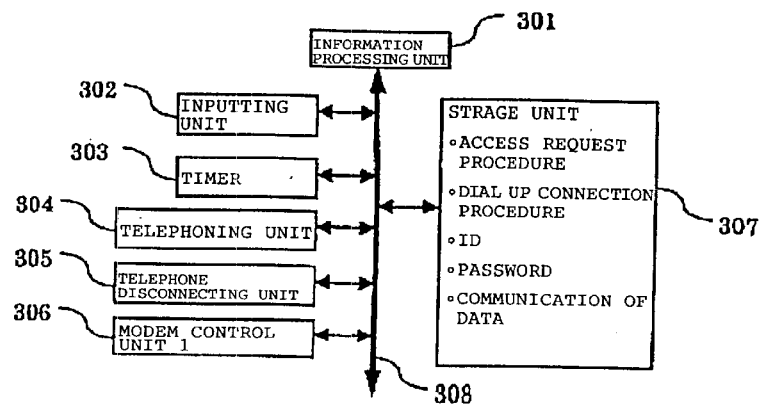
Fig. 3
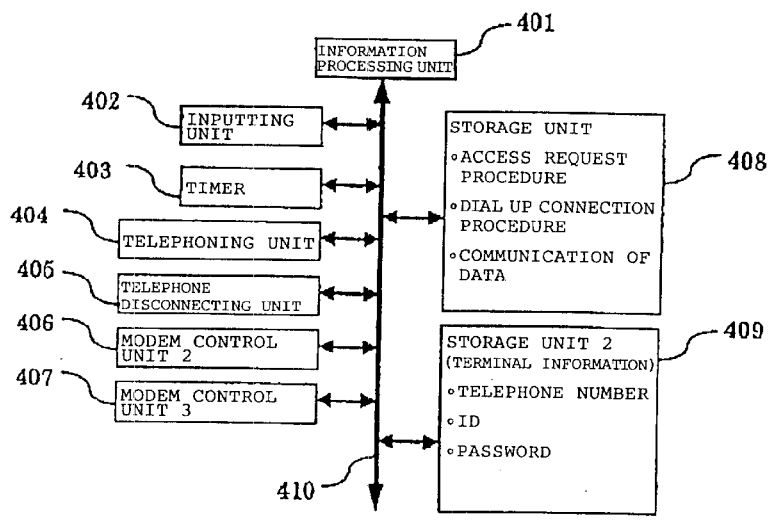
Fig. 4
| TERMINAL NAME | ID | Password | TELEPHONE NUMBER |
|---|---|---|---|
| CLIENT A | ABC1234 | Y389T | 03-XXXX-1234 |
| CLIENT B | TXY2323 | ABH3R | 0425-XX-9876 |
| CLIENT C | HHG4567 | 98765 | 03-XXXX-4563 |
| CLIENT D | XCV0023 | QW11G | 047-XXX-2345 |
| CLIENT F | TUY9902 | 6UT8 | 03-XXXX-4563 |
| CLIENT H | PPT3114 | 232HT | 03-XXXX-3698 |
| : | : | : | : |

| CONTENTS OF ACCESS REQUEST PROCEDURE |
|---|
| ACCESS REQUEST COMMUNICATION SEQUENCE |
| ACCESS REQUEST IDENTIFIER |
| IDENTIFIER IN RESPONSE TO ACCESS REQUEST |
| IDENTIFIER ACKNOWLEDGING RECEIPT OF RESPONSE TO ACCESS REQUEST |
| IDENTIFIER INDICATING FAILURE IN ACCESS REQUEST PROCEDURE |

| CONTENTS OF DIAL UP CONNCTION PROCEDURE |
|---|
| DIAL UP CONNECTION COMMUNICATION SEQUENCE |
| DIAL UP CONNECTION IDENTIFIER |
| ID REQUEST IDENTIFIER |
| PASSWORD REQUEST IDENTIFIER |
| DIAL UP AUTHENTICATION RESULT REPORT |
| DATA COMMUNICATION ORDER |
| DIAL UP DISCONNECTION SEQUENCE |

COMMUNICATION SYSTEM FOR SELECTIVELY CONNECTING A SERVER TO NUMEROUS TERMINAL UNITS OVER A PUBLIC NETWORK

BACKGROUND OF THE INVENTION

1. Field of the Invention

This invention relates to an accessing system for a network which includes a plurality of information terminal units (clients) and a center unit (server) which stores electronic mails from remote places or other electronic information for the client and performs calculations and processes of information for the client, and more particularly to an accessing system for a network used for requesting a server to perform access to information, access to electronic mail and do calculations by connection through which a radio unit such as a land mobile radio telephone set is used.

Here, the present invention doesn't relate to an accessing system such as a leased data transmission path which is commonly used by a LAN (local area network) but to a data transmission path which uses a public network on which a radio unit such as a land mobile radio telephone is utilized.

It is to be noted that, in an access system which uses a leased data transmission path, the basic data transmission path is normally in a connected state between a client and a server such that data can normally be communicated between them.

On the other hand, in an access system on a data transmission path which uses a public network, the basic data transmission path is normally in a disconnected state, and immediately prior to communication of data, it is necessary for a client to dial up a server to connect a data transmission path.

In an access system which uses a public network, communication of data cannot be performed between a client and a server before a call is connected. In the procedure of utilizing a public network to connect a call, the process of dialing for connecting a call is sometimes performed by a server which dial up a client to connect the call.

The present invention relates to a method of automatically establishing a data transmission path, which uses a public network, between a client and a server and particularly relates to an accessing system for a network for communicating data on the data transmission path.

2. Description of the Related Art

In one conventionally available connection system of an access system in which a server connectable to a plurality of clients can be connected at any time with any client and transmit information or data requested by the client or receive information or data from the client which uses a public network is used to establish a data transmission path between the server and the client, a dial up connection system for connection of the public network is performed from the client side and the server authorizes the connection of the client. The server acknowledges the connection of the client and then communicates data, providing various services to the client.

Further, as an application of the dial up connection system, a call back connection system is available as disclosed in Japanese Patent Laid-Open No. 88469/1991 wherein, in order to reduce the burden of the connection charge of a public network on the client side, a call is originated from a client to a server and the server side requests the client to re-originate a call, and then the call is disconnected, whereafter a call is originated from the server side and authentication of the client is performed, and thereafter, data are communicated.

The two conventional methods described above are common in that a trigger for communication is provided from a client, and are widely known as methods wherein a server (remote access server: RAS) for which a public network is used to establish a connection is accessed by a client.

Also a procedure (protocol) for connection and transmission/reception of data has been laid open (for example, PPP: point to point protocol—RFC1331, RFC= "Request for comment"). Any method wherein a client connects to a RAS presupposes that the client always provides the trigger for connection.

A method wherein a client connects to a RAS(Remote Access Server) as in the conventional examples described above has a problem in that, since it is presumed that the client will provide a trigger for connection, a data transmission request initiated by the server cannot be started at a time desired by the server.

If the server and the client have such a relationship that they are on a network wherein a data transmission path is normally in a connected state like a LAN (local area network), then a data transmission request initiated by the server can be started at any time desired intended by the server. However, in most of systems at present, in which a public network is used in order to establish a connection, the client side has the initiative in the connection timing.

The simplest solution would be a system constructed to provide a server function to the client. In short, the roles of the client and the server in the foregoing description would be reversed so that the client has the function of permitting connection from the server and communicating data after it acknowledges the connection of the server. This method can be devised readily from the prior art.

However, when the construction described above is employed, since the client authenticates a request for connection from the server, a false client cannot be discriminated. Therefore, there remains the problem of security on the server side.

Further, a device for accepting a connection and performing authentication must be provided on the client side. Consequently, the device would occupy a memory or a file on the client side. Particularly where the client is a portable radio information terminal of a small size it would be greatly disadvantages to be occupied by the device. Consequently, the problems described above must be solved with the client having a mechanism as simple as possible and by assuring security.

SUMMARY OF THE INVENTION

The present invention has the following objects.

A first object of the present invention is to provide a system wherein a dial up system used conventionally is used and, while the connection between a client and a server is maintained, the server side provides a trigger for communication. In short, the present invention proposes a method wherein, the server side requests the client to establish a connection at the time a request for communication is made.

A second object of the present invention is to provide a method of leveling resource loads at a server by managing and allocating in advance an access time to the server for each of clients registered.

A third object of the present invention is to provide a method of improving the operability for a user of a client by requesting, when a process requested by a client registered in advance is completed on the server side, the client to accept the results of the process.

A fourth object of the present invention is to provide a method by which, in response to a trigger from the outside to a client registered in advance such as arrival of mail, access can be requested anew from the client, thereby improving the operability for a user of the client.

A fifth object of the present invention is provide a method wherein a client can be requested to accept various resources such as a CPU resource and a file resource regarding a client registered in advance under the management of a server so that resources at the server can be saved.

In order to achieve the objects described above, in the present invention, communication data at a server to be sent to a client are sent to the client at a timing unique to the server by the following procedure.

The server has a table in which clients and telephone numbers are stored in a paired relationship in advance, and the server refers to the table when originating a telephone call to an object client.

At the time when a modem line is connected, the server sends to the client an identifier indicating a request for the client to access (for example, PPP connection) the server.

After reception of the request is confirmed, the client disconnects the modem line temporarily, and originates a telephone call to access the server. Then, the client accepts communication of data from the server, thereby receiving the data communication which the server intended to send the client.

The accessing system of a network according to the present invention has means which uses a protocol, simpler and has a smaller amount of communication than other protocols. This protocol is used to have the server send communication data to an arbitrary client to issue a connection request to a client so that the client can use a safe protocol conventionally used to connect to the server in order to accept communication data.

In the present invention having the construction described above, although, a conventional a dial up system is used and the client/server relationship is maintained, when a request for communication is made on the server side, a request for connection can be issued from the server side to the client side.

Further, access times to the server can be collectively managed and allocated from the server side to individual clients registered in advance.

Further, when processes requested from clients registered in advance are completed on the server side, the server can request the clients to accept the results of the processes.

Further, in response to a trigger from the outside for a client registered in advance, such as for arrival of mail, the server can request the client to access the server.

Further, the server can issue to a client registered in advance a request for acceptance of various resources such as a CPU and a file for the client under the management of the server.

The above and other objects, features and advantages of the present invention will become apparent from the following description with reference to the accompanying drawings which illustrate examples of the present invention.

BRIEF DESCRIPTION OF THE DRAWINGS

FIG. 2 is a view showing an example of the construction at the client shown in FIGS. 1a, 1b;

FIG. 3 is a view showing an example of the construction at the server shown in FIGS. 1a, 1b;

FIG. 4 is a view illustrating a concept of terminal information stored in a storage apparatus shown in FIG. 3;

DETAILED DESCRIPTION OF THE PREFERRED EMBODIMENTS

Figure 1A:
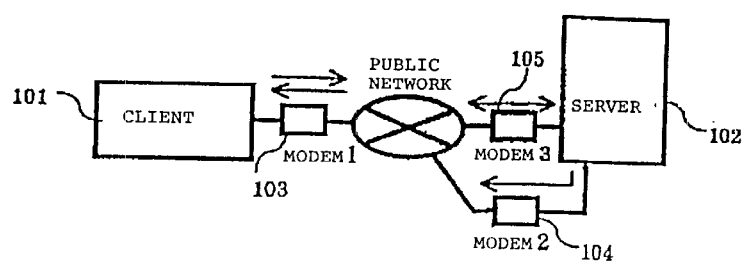
FIG. 1a is a view showing an example wherein a client and a server are connected in a one-to-one relationship with each other for a network of the present invention.
Figure 1B:
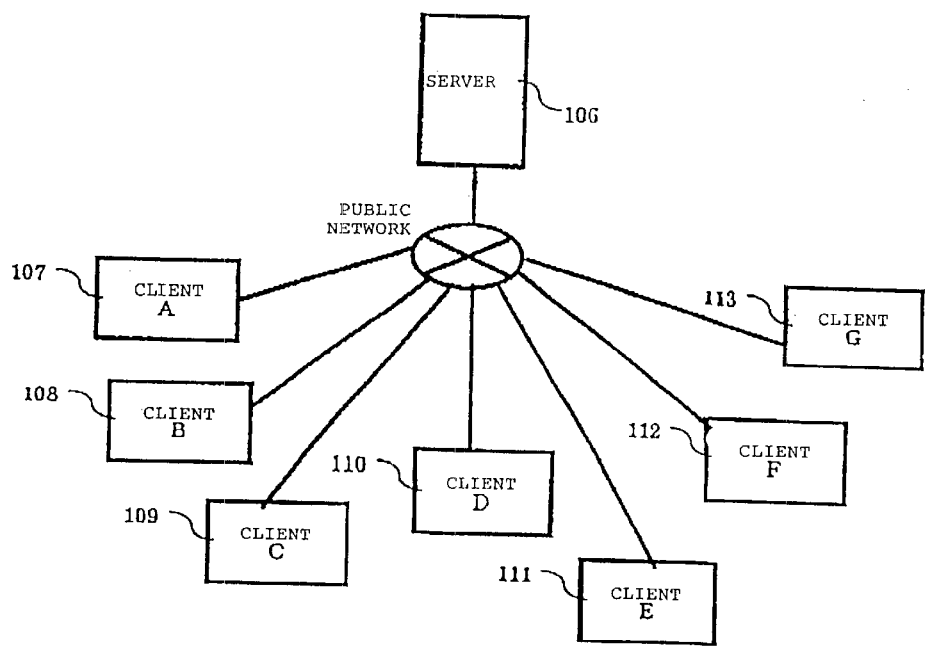
FIG. 1b is a view showing another example wherein a plurality of clients are connected to a server for a network of the present invention.

FIG. 1a is a view showing an example wherein a client and a server are connected in a one-to-one relationship as a network of the present invention;

FIG. 1b is a view showing another example wherein a plurality of clients are connected to a server as a network of the present invention;

Although, in FIG. 1a, client 101 and server 102 are connected in a one-to-one relationship over public network 120 for the convenience of illustration, normally client 101 and server 102 are in a network of a plurality of clients 107 to 113 connected to single server 106 over public network 120 as shown in FIG. 1b.

In this instance, in FIG. 1b, exchanges provided in public network 120 serve as switches, and only one client, for example, client 107, communicates with the server at a time. Therefore, the following description proceeds under the assumption that client 101 and server 102 are connected in a one-to-one relationship as shown in FIG. 1a.

Although an apparatus for simultaneous connection of a plurality of clients is sometimes provided on server 106, also in this instance, processing operation in server 106 is performed independently for each of the clients. Therefore, as described above, the following description of the present embodiment proceeds under the assumption that client 101 and server 102 are connected in a one-to-one relationship as shown in FIG. 1*a*. This, however, does not deny that a plurality of clients can be connected simultaneously to server 102 in the present invention.

Referring to FIG. 1*a*, client 101 uses modem 103 to covert data into an audio signal and connects the audio signal to public network 120.

Similarly, server 102 uses modem 105 to convert data to an audio signal and connects the audio signal to public network 120. When the connection from client 101 and server 102 are connected to each other on the public network, communication is enabled.

While, in FIG. 1*a*, server 102 utilizes two modems 104, 105, this is intended to illustrate, in the present embodiment, the two modems separately for different processes performed by the server. This does not mean that, when the present invention is carried out, the number of modems to be utilized by server 102 is limited to 2, but the number of modems to be connected to server 102 may be one or three or more if server 102 is constructed so that modem use requests generated for individual processes do not interfere with each other when modem time use is taken into consideration.

Further, since modems 103 to 105 are signal conversion apparatus which convert from data into an audio signal, this presuppose that public network 120 is an audio line such as a telephone line, and if public network 120 is a digital signal line other than an audio line, then modems 103 to 105 can be replaced with signal conversion apparatus suitable for the digital signal line. For example, where an ISDN (Integrated Services Digital Network) line is used for public network 120, a terminal adapter (TA) may be utilized.

In the following, a construction of client 101 is described.

FIG. 2 is a view showing an example of the construction of client 101 shown in FIGS. 1*a*, 1*b*.

Client 101 in the present form includes, as shown in FIG. 2, information processing unit 301, storage unit 307, inputting unit 302, timer 303, telephoning unit 304, telephone disconnecting unit 305 and modem control unit 306, which are all connected to one another over internal bus 308 so that data can be communicated between them.

Information processing unit 301 uses procedures (programs) of operation, data and so forth stored in storage unit 307 and can select a plurality of operation procedures prepared in advance in response to an instruction by a user through inputting unit 302.

Further, information processing unit 301 can measure time by providing a starting instruction and a stopping instruction to timer 303.

Furthermore, information processing unit 301 can provides time information and give a starting instruction to timer 303 so that timer 303 can interrupt information processing unit 301 when the time given thereto elapses.

Further, information processing unit 301 can utilize telephoning unit 304 to issue an instruction to modem control unit 306 to originate a call. Similarly, information processing unit 301 can utilize telephone disconnecting unit 305 to issue an instruction to modem control unit 306 to disconnect the telephone line.

Modem control unit 306 controls modem 103 connecting from client 101. Modem control unit 306 includes an input/output buffer for delivering data from and to modem 103, and an interruption unit for reporting to information processing unit 301 that a telephone call has arrived at modem 103 from the public network.

However, if modem 103 connecting to client 101 is a signal conversion apparatus of a type different from the modem, then modem control unit 306 is replaced with a control unit suitable for a signal conversion apparatus of the different type. Also a control unit suitable for signal conversion apparatus of a different type has an input/output buffer and an interruption unit similar to modem control unit 306.

Storage unit 307 has stored therein an access request procedure for responding to an access request sent from server 102 to client 101, a dial up connection procedure for performing for dialing up connection/disconnection to server 102 from client 101, an ID and a Password which are used in the dial up connection procedure, and communication data for communicating with server 102.

In the following, a construction of server 102 is described.

FIG. 3 is a view showing an example of the construction of server 102 shown in FIGS. 1*a*, 1*b*.

Server 102 in the present embodiment includes, as shown in FIG. 3, information processing unit 401, storage units 408, 409, inputting unit 402, timer 403, telephoning unit 404, telephone disconnecting unit 405, and modem control units 406, 407, which are all connected to one another by internal bus 410 so that data can be communicated between them.

Information processing unit 401 uses procedures (programs) of operation and various data stored in storage unit 408 and can select a plurality of operation procedures prepared in advance in response to an instruction by a user inputted through inputting unit 402.

Further, information processing unit 401 can measure time by providing a starting instruction and a stopping instruction to timer 403.

Furthermore, information processing unit 401 can provide time information and give a starting instruction to timer 403 so that timer 403 can interrupt information processing unit 401 when the time given thereto elapses.

Further, information processing unit 401 can utilize telephoning unit 404 to instruct modem control unit 406 to originate a telephone call. Similarly, information processing unit 401 can utilize telephone disconnecting unit 405 to instruct modem control unit 406 to disconnect the telephone line.

Further, information processing unit 401 can utilize telephoning unit 404 to instruct modem control unit 407 to originate a telephone call. Similarly, information processing unit 401 can utilize telephone disconnecting unit 405 to instruct modem control unit 407 to disconnect the telephone line.

Modem control unit 406 controls modem 104 connecting from server 102. Modem control unit 407 controls modem 105 connecting from server 102.

Each of modem control units 406, 407 has an input/output buffer for communication data to and from modems 104, 105, and an interruption unit for reporting to information processing unit 401 that a telephone call has arrived at modem 104, 105 from the public network.

However, when modems 104, 105 connecting to server 102 are signal conversion apparatus of a type different from that of the modems, the modem control units 406, 407 are replaced with control units suitable for the signal converters of the different type. Also each of the control units suitable for the signal converters of the different type has an input/output buffer and an interruption unit similar to modem control unit 406, modem control unit 407.

Storage unit 408 has stored in advance therein an access request procedure for sending an access request from server 102 to client 101, a dial up connection procedure for permitting, from client 101, connection in response to dial up connection/disconnection to/from server 102, and communication data for communicating with client 101.

Further, the other storage unit 409 has placed as terminal information in advance therein a table in which an ID, a Password and a telephone number for each client to be used in the dial up connection procedure are stored.

The terminal information is prepared in advance for the number of clients for which dial up connection to server 102 is permitted, and information processing unit 401 can suitably use to the terminal information for each client with which it tries to communicate.

FIG. 4 is a view illustrating a concept of the terminal information stored in storage unit 409 shown in FIG. 3.

Figures 5, 6:
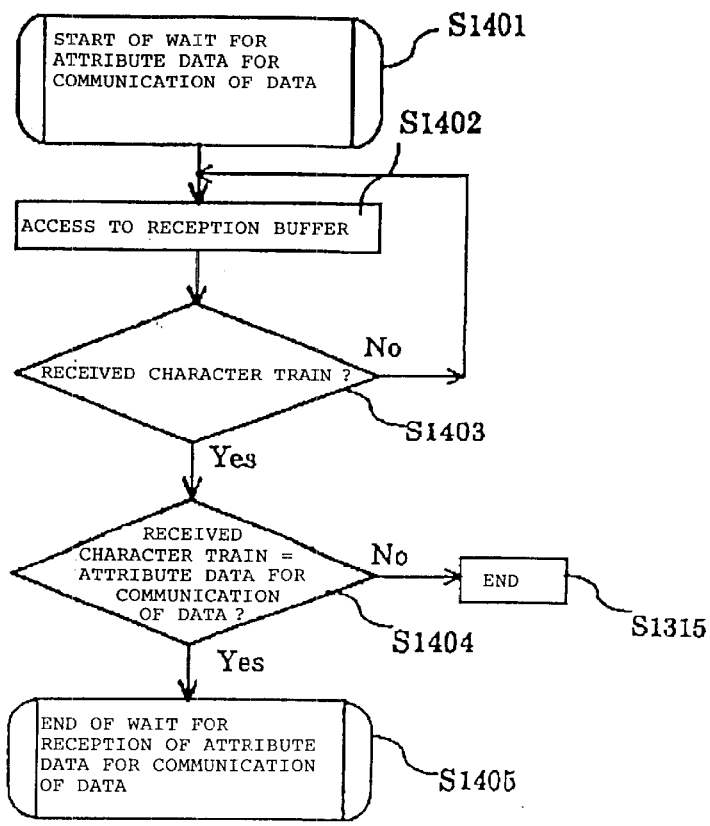
FIG. 5 is a flow chart illustrating a flow of waiting for reception of attribute information for communication of data.
FIG. 6 is a view illustrating an example of contents of a dial up connection procedure.

FIG. 5 is a flow chart illustrating a flow of waiting for reception of attribute information for communication of data.

The access request procedure illustrated in FIG. 5 includes an "access request communication procedure" in which a sequence of communications of a plurality of identifiers described below, which are sent between server 102 and client 101, is described. A character train "access request identifier" reports that server 102 has started an access request. Further, a character train "identifier in response to access request" indicates that client 101 has received the access request identifier and acknowledges that server 102 will be accessed later. A character train "identifier reporting acceptance of access request" for reporting to client 101 that server 102 has ended processing and communication for the access request, and a character train "identifier indicating failure in access request procedure" for reporting to the other party that an identifier received from the other party during the series of access request processes described above cannot be acknowledged.

FIG. 6 is a view illustrating an example of contents of the dial up connection procedure.

The dial up connection is a method for communication including a protocol for allowing client 101 to connect to server 102, receive an authentication for communicating with server 102 from server 102 and receive permission for communication from server 102, a protocol for allowing client 101 to transmit and receive actual data such as mail to and from server 102, a protocol for ending and disconnecting the dial up connected communication, and a plurality of identifiers to be used in the series of protocols.

In the present embodiment, the dial up connection procedure is not defined particularly, but it is presumed that the prior art is suitably used for the dial up connection procedure. Here, as an example of contents of the dial up connection procedure stored in storage units 307, 408, a simple example of contents is described.

The dial up connection procedure includes a "dial up connection communication procedure" in which a sequence of communications of a plurality of identifiers given below which are communicated between server 102 and client 101, a "dial up connection identifier" for reporting that client 101 starts dial up connection, an "ID request identifier" for allowing server 102 to receive the dial up connection identifier and then request client 101 to transmit an ID, a "Password request identifier" for allowing server 102 to request client 101 to transmit a password, a "dial up authentication result report" for allowing server 102 to report to client 101 the result of discriminating whether or not client 101 should be authenticated from contents of the ID and the Password received from client 101, a "data communication sequence" indicating a procedure for allowing client 101 to communicate actual data such as mail with server 102 after client 101 is authenticated by server 102, and a "dial up disconnection sequence" for ending communication between server 102 and client 101 and disconnecting the line after the communication of actual data is completed.

In the following, the protocol of the present invention and operation and states of client 101 and server 102 are described.

Figure 7:
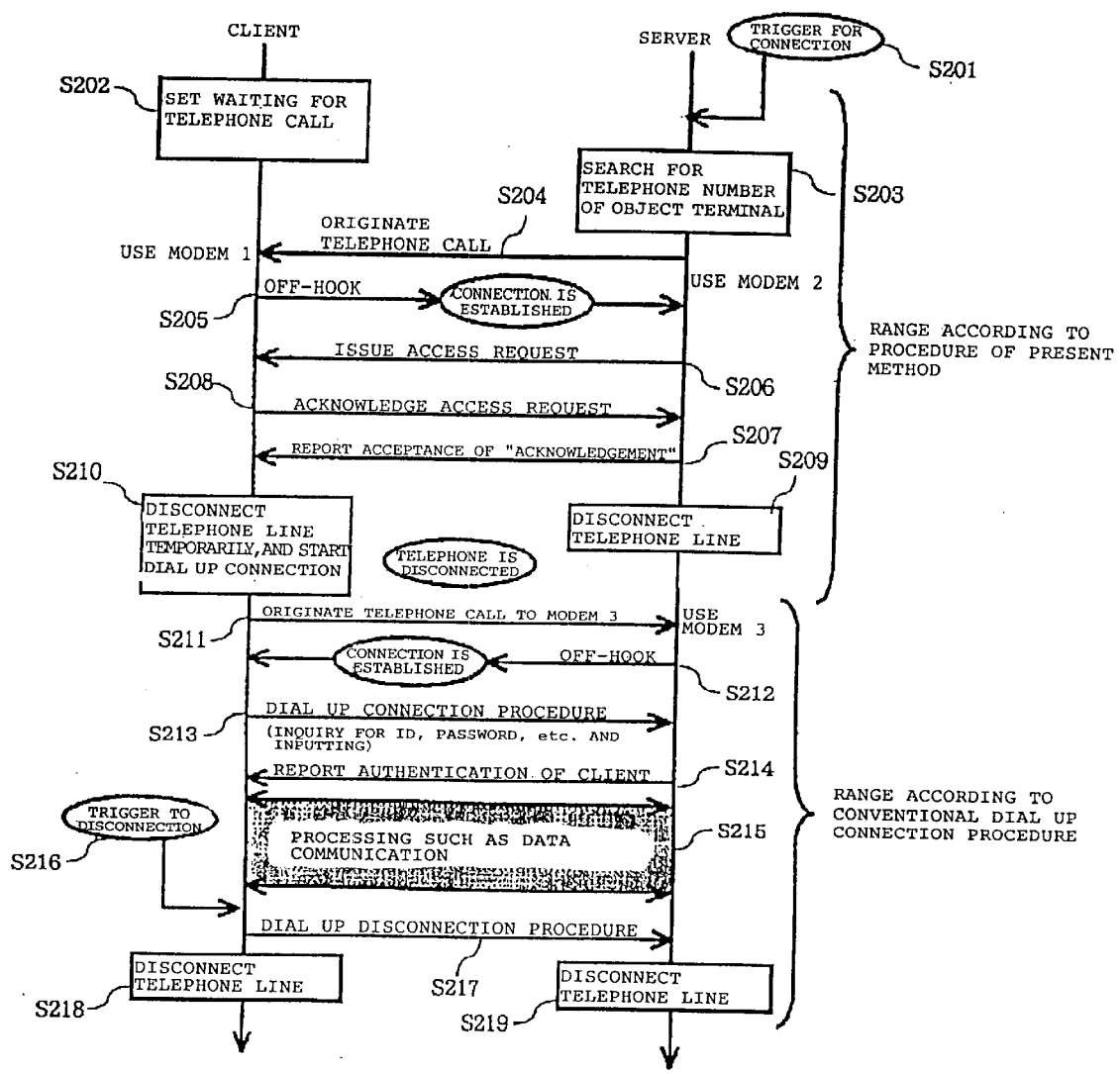
FIG. 7 is an operation concept diagram for explaining operation of the access system for the networks shown in FIGS. 1a, 1b.

FIG. 7 is an operation concept diagram for illustrating operation of the accessing system for the network shown in FIGS. 1a, 1b, and illustrates operation of the system including the present invention as a procedure of communication (protocol) performed between client 101 and server 102 and states of client 101 and server 102 in accordance with the protocol.

In the present embodiment, when an electronic mail reception process which operates in server 102 receives electronic mail destined for arbitrary client 101 from another network, the following sequence of operations are performed. In particular, client 101 dial up connects to server 102, and a process according to the present system in server 102 reports the arrival of the electronic mail to client 101 so that client 101 may start an operation of receiving the electronic mail by the mail reception process of server 102. In response to the report, client 101 dial up connects to the server in order to obtain the electronic mail, receives the electronic mail and dial up disconnects the connection.

Client 101 has completed necessary initialization of modem 103 and so forth so as to allow later termination of a call of a telephone line at step S202.

Operation of the present embodiment is started as a rigger for connection is generated by server 102 at step S201.

The trigger for connection at step S201 may possibly be done by another process which operates on server 102 or by another apparatus which connects to server 102. While, in the present invention, it is not particularly defined what generates the trigger for connection, in the present embodiment, a trigger for connection of the present system is generated when the electronic mail reception process which operates on server 102 receives electronic mail designated for delivered to client 101. In this instance, the electronic mail reception process designates a client, to which the electronic mail is to be delivered, to generate a trigger for connection.

The process according to the present system at client 101 (the process is hereinafter referred to simply as "server 102") refers to the table, in which the clients and the telephone numbers are stored in a paired relationship, to find the telephone number of the client to which the electronic mail is to be delivered (or a terminal unit which is the object of the delivery) at step S203, and designates the telephone number and issues an instruction to originate a telephone call to modem 104 through telephoning unit 404 at step S204.

On the other hand, the telephone call arrives at modem 103 connecting to client 101 from the server side.

Client 101 instructs modem 103 to perform an off-hook operation and connects the telephone line between the client side and the server side at step S205.

In accordance with an ordinary protocol between modems publicly known at present, negotiation is performed automatically between client side modem 103 and server side modem 104 so that character train data may be communicated between a plurality of computers (which signify, in the present embodiment, client 101 and server 102) connecting to the modems.

In this state, server 102 issues an access request to client 101 at step S206.

The access request is a character train which signifies a request for client 101 to perform dial up connection to server 102 later.

Client 101 acknowledges the access request at step S208 and reports to server 102 that the access request has been received.

Server 102 instructs client 101 to acknowledge the access request at step S207.

Server 102 requests modem 104 to disconnect the line immediately after the report is issued at step S209.

On the other hand, after it receives the report from server 102 at step S207, client instructs modem 103 to disconnect the line at step S210.

At this point of time, the connection between client 101 and server 102 and the telephone line are in a cut state.

For later operation, a conventional dial up connection method is used, and the present invention does not limit the method of the dial up connection. Therefore, operations in steps S211 to S219 are not limited to those illustrated in FIG. 7, and it is presumed that a conventional protocol which realizes authentication and data security necessary for a server and a client in pair such as PPPs to perform data communication is used. In the present embodiment, the PPP connection method is described briefly.

Client 101 instructs modem 103 to originate a telephone call to modem 105 on the server side at step S211.

The telephone call arrives at modem 105 which connects to server 102. Server 102 instructs modem 105 to perform an off-hook operation, and connects a telephone line between the client side and the server side at step S212. In accordance with an ordinary protocol between modems publicly known at present, negotiation is performed automatically between client side modem 103 and server side modem 105 so as to thereafter allow character train data to be communicated between a plurality of computers (which signify, in the present embodiment, client 101 and server 102) connecting to the modems.

In this state, a sequence of steps regarding dial up connection including dial up connection request from client 101 to server 102, inquiry for an ID and a Password from server 102 to client 101 and inputting of an ID and a Password by client 101 responding to the inquiry are performed at step S213. If the ID and the Password in combination are authenticated by server 102, then server 102 reports a result of the authentication of client 101 to client 101 at step S214.

If the result of authentication indicates that the ID and the Password have not been authenticated normally, then this signifies that client 101 does not have a legal connection right, and the sequence of steps is ended. Here, the following description proceeds under the assumption that client 101 has a legal connection right in advance and the reporting at step S214 of the result of authentication is completed normally.

After client 101 is authenticated normally by server 102, data can be communicated between them in accordance with the PPP communication protocol at step S215. The communication data communicated between them then are secured by the PPP communication protocol.

If client 101 accepts electronic mail from server 102, then the arbitrary data communication is completed, and if the user operates inputting unit 302 or if no communication occurs for an arbitrary fixed time measured by timer 303, then client 101 issues the dial up disconnection procedure to server 102 at step S217.

Server 102 permits the dial up disconnection, and information processing unit 301 of client 101 provides a line disconnecting instruction to modem control unit 306 through telephone disconnecting unit 305 to disconnect the line to the server side at step S218.

Also on the server side, server 102 permits the dial up disconnection, and information processing unit 401 provides a line disconnecting instruction to modem control unit 407 through telephone disconnecting unit 405 to disconnect the line to the client side at step S219.

The sequence of processes of the present embodiment is ended in such a manner as described above. Even after the sequence of processes is ended, the present system performs processing similar to that described above if a trigger for connection at step S201 is produced on the server side again.

First Embodiment

Now, a flow of operation of client 101 in the first embodiment is described.

Figure 8:
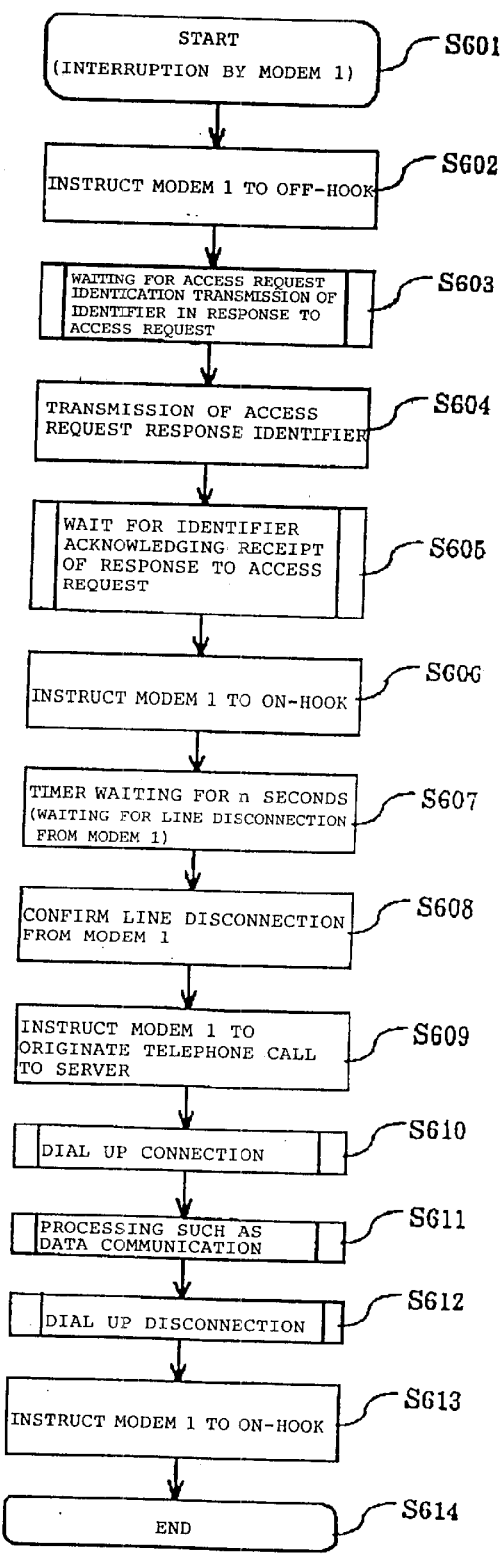
FIG. 8 is a flow chart for explaining a first embodiment of operation of the client shown in FIG. 2.

FIG. 8 is a flow chart for explaining the first embodiment of operation of the client shown in FIG. 2.

Except for initialization processing of the apparatus, operation of the client is started when a request for interruption from modem control unit 306 is inputted at step S601. Modem control unit 306 must be initialized in advance so that, when a telephone call from server side modem 104 is terminated at modem control unit 306, a request for interruption may be inputted to information processing unit 301.

Information processing unit 301, which has come to know termination of a telephone call from the server side from interruption from modem control unit 306, instructs modem control unit 306 to perform an off-hook operation at step S602. Consequently, modem 104 on the server side which has originated the telephone call and client side modem 103 are connected to each other over the public network. Simultaneously, negotiation is performed between modem 103 on the client side and modem 104 on the server side so that client 101 and server 102 can thereafter communicate with each other a synchronously with character train data.

Then, information processing unit 301 waits for reception of the "access request identifier" at step S602.

If the "access request identifier" is received, then information processing unit 301 reads the "identifier in response to the access request" from storage unit 307, and writes the "identifier in response to the access request" into an output buffer of modem control unit 306. Modem control unit 306 transmits the character train data written in the output buffer to modem 104. As a result, the "identifier in response to the access request" is transmitted from information processing unit 301 to the server side at step S604.

Information processing unit 301 waits, after it transmits the identifier in response to the access request, for reception of the "identifier acknowledging receipt of the response to the access request" from the server side at step S605. If the "identifier acknowledging receipt of the response to the access request" is received, then information processing unit 301 renders telephone disconnecting unit 305 operative. Consequently, telephone disconnecting unit 305 instructs modem 103 to perform an on-hook operation through modem control unit 306. As a result of the processing, information processing unit 301 instructs modem 103 to perform an on-hook operation at step S606, and instructs modem 103 to cut the line.

Thereafter, since actually several seconds are required until exchanges and so forth on the public network disconnects the line completely, information processing unit 301 takes the required time into consideration and stops its operation for n seconds before it starts next operation of originating a telephone call (for example, n is 10 seconds). In this instance, information processing unit 301 issues a starting instruction to timer 303, and performs next processing after a report is received by interruption of timer 303 after n seconds.

Information processing unit 301 renders telephoning unit 304 operative after it confirms the line disconnection of modem control unit 306, and telephoning unit 304 instructs modem 103 to originate a telephone call to server side modem 105 through modem control unit 306. As a result of this processing, information processing unit 301 instructs modem 103 to originate a telephone call at step S609.

After the telephone call is connected in the manner as described above, information processing unit 301 performs dial up connection at step S610 and communication at step S611 processing of data and so forth in accordance with the dial up connection procedure (FIG. 9) in storage unit 307, and performs dial up disconnection at step S612 after completion of the communication. Here, the PPP communication procedure is utilized as the dial up connection procedure.

After the dial up disconnection is ended, information processing unit 301 instructs modem control unit 306 to disconnect the telephone line. Upon reception of the instruction, modem control unit 306 instructs modem 103 to perform an on-hook operation at step S613.

When the on-hook operation is performed, the line is disconnected by the exchanges on the public network, and consequently, the line between client 101 and server 102 is disconnected completely. Here, although information processing unit 301 may confirm that the line has been disconnected, in the present embodiment, the confirmation is not performed particularly.

The sequence of processes for electronic mail reception by client 101 in response to the access request from the server side is ended at step S614. Even after the sequence of processes is ended, client 101 performs processing similar to that described above if a request for interruption at step S601 from the modem is produced again.

Figures 9, 10:
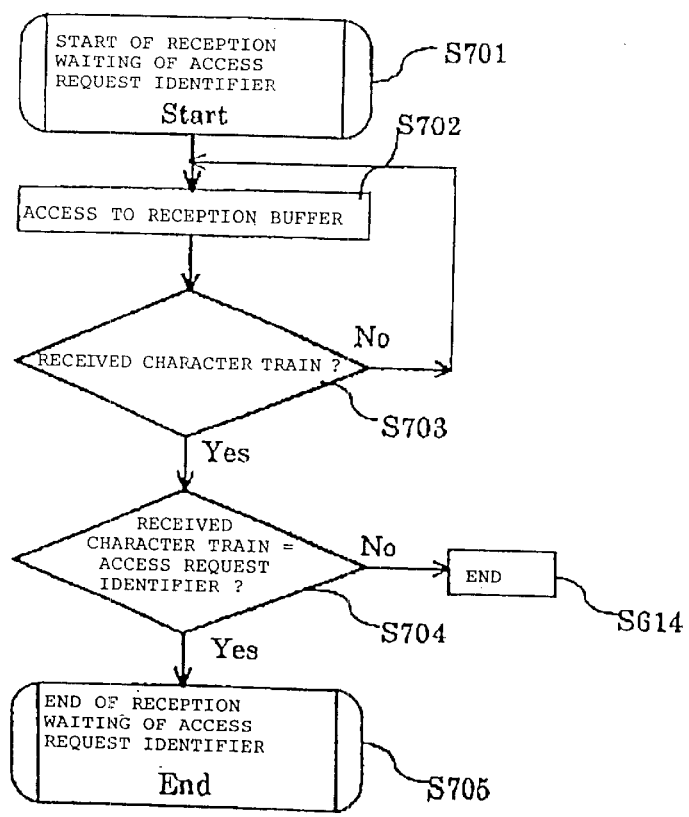
FIG. 9 is a view illustrating contents of the dial up connection procedure.
FIG. 10 is a view particularly showing the flow of the processing of waiting for an access request identifier illustrated in FIG. 8.

FIG. 10 is a view particularly showing the flow of the processing of waiting for the access request identifier illustrated in FIG. 8.

After waiting for recepttting of the access request identifier is started at step S701, information processing unit 301 refers to the input buffer of modem control unit 306 at step S702.

Information processing unit 301 checks whether or not the input buffer has a newly received character train therein at step S703, and if there is no newly received character train in the input buffer, then information processing unit 301 refers to the input buffer of modem control unit 306 again at step S702.

If there is a received character train in the input buffer, then information processing unit 301 compares the character train with the "access request identifier" stored in storage unit 307 in advance at step S704.

If a result of the comparison shows in coincidence, then information processing unit 301 determines that no access request has been received from the server side, and ends this process at step S614.

If the character train coincides with the "access request identifier", then information processing unit 301 completes reception of the access request identifier waiting for at step S603 processing and advances its process to next processing at step S604.

Figure 11:
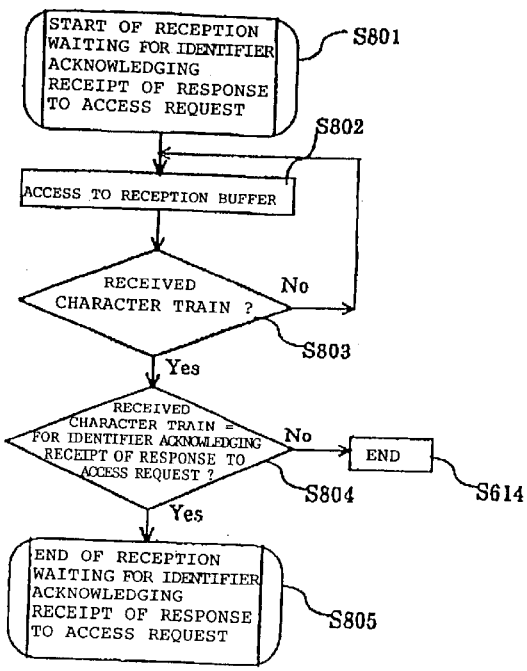
FIG. 11 is a view particularly showing the flow of waiting for an identifier reporting the reception of a response to an access request illustrated in FIG. 8.

FIG. 11 is a view particularly showing the flow of waiting for identifier reporting the reception of a response to an access request identifier illustrated in FIG. 8.

After reception waiting of the identifier acknowledging receipt of the response to the access request is started at step S801, information processing unit 301 refers to the input buffer of modem control unit 306 at step S802.

Information processing unit 301 checks whether or not the input buffer has a newly received character train therein at step S803. If the input buffer has no character train therein, then information processing unit 301 refers to the input buffer of modem control unit 306 again at step S802. If the input buffer has a received character train therein, then information processing unit 301 compares the character train with the "identifier acknowledging receipt of the response to the access request" stored in advance in storage unit 307 at step S804.

If a result of the comparison shows in coincidence, then information processing unit 301 determines that there is some trouble in the communication with the server side, and this process is ended at step S614.

If the character train coincides with the "identifier acknowledging receipt of the response to the access request", then information processing unit 301 completes the waiting at step S605 processing for reception of the identifier acknowledging receipt of the response to the access request and advances its processing to the next step at step S606.

Figure 12:
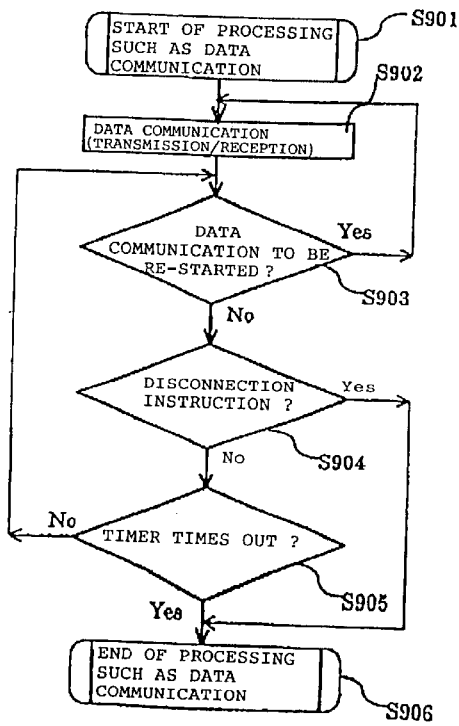
FIG. 12 is a view particularly illustrating the flow of processing of data communication and so forth illustrated in FIG. 8.

FIG. 12 is a view particularly illustrating the flow of the processing of data communication and so forth illustrated in FIG. 8.

After the processing for data communication and so forth is started at step S901, information processing unit 301 performs transmission or reception of data in accordance with the PPP protocol at step S902.

Here, in order to perform acceptance of mail, information processing unit 301 receives the mail through modem control unit 306 and successively stores the mail data into storage unit 307.

Normally, when data are received in accordance with the PPP protocol, the communication data are divided for each arbitrary data size, and if an error is detected during communication of each unit data, then the unit data are sent again.

When the data communication is started at step S902, information processing unit 301 starts timer 303. If the data communication completes, then information processing unit 301 checks whether or not there is re-starting of data communication at step S903.

If there is re-starting, then data communication is performed again at step S902.

If there is no re-starting, information processing unit 301 checks whether or not there is a disconnection instruction from a next user at step S904.

If there is a disconnection instruction, then the present routine is stopped immediately at step S906.

If there is no disconnection instruction, then information processing unit 301 checks timer 303, which was started formerly in step S902, to discriminate whether or not an arbitrary fixed time has elapsed. This is an operation of compulsorily ending the connection of the line when there is no communication within a predetermined fixed time in order to save the charge for use of the public network and the line resources.

If timer 303 indicates that the elapsed time is within the arbitrary fixed time, then information processing unit 301 executes the processing of checking of re-starting of data communication again at step S903.

If the elapsed time exceeds the arbitrary fixed time, then the present routine is ended at step S906.

In the following, a flow of operation of server 102 in the first embodiment is described.

Figure 13:
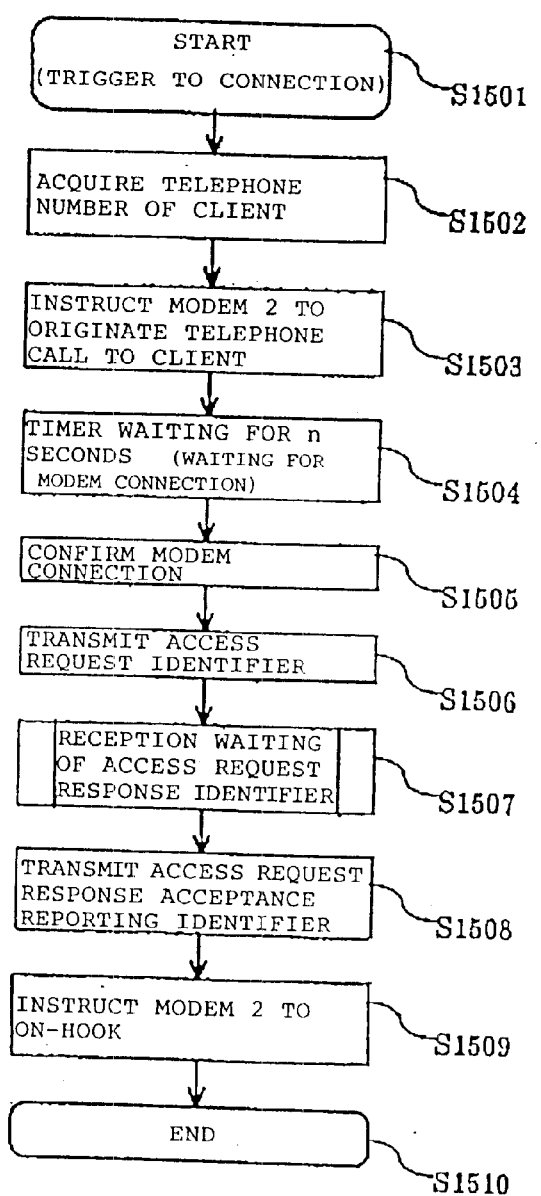
FIG. 13 is a flow chart for explaining a first embodiment of operation of the server shown in FIG. 2.

FIG. 13 is a flow chart for explaining the first embodiment of the operation of the server shown in FIG. 2.

Except for initialization processing of the apparatus, operation of server 102 according to the present invention is started if, when the electronic mail reception process which operates on server 102 receives electronic mail designated for delivery to client 101, the electronic mail reception process reports a "terminal name" for specifying client 101 in the process of the present invention to generate a trigger for connection of the present system at step S1501.

Information processing unit 401 refers to the terminal information (refer to FIG. 4) stored in advance in storage unit 409 using the "terminal name" received from the electronic mail reception process as a key to acquire a telephone number of an object terminal at step S1502.

For example, if information processing unit 401 receives client A as the "terminal name", then information processing unit 401 refers to the terminal information (refer to FIG. 4) to acquire the telephone number "03-XXXX-1234".

Information processing unit 401 designates the telephone number "003-XXXX-1234" of client A and renders telephoning unit 404 operative. Consequently, telephoning unit 404 instructs modem 104 to originate a telephone call to modem 103 through modem control unit 406. As a result of this processing, information processing unit 401 instructs modem 104 to originate a telephone call at step S1503.

Consequently, modem 104 on the server side which has originated the telephone call and client side modem 103 are connected to each other by the public network. Simultaneously, negotiation is performed between modem 103 on the client side and modem 104 on the server side so that client 101 and server 102 can thereafter communicate with each other a synchronously by using character train data.

Information processing unit 401 stops its processing while the modems are negotiating (for m seconds: for example, m=10) at step S1504.

Thereupon, information processing unit 401 issues a starting instruction to timer 403, and advances to next processing after it receives a report by an interruption of timer 403 after m seconds.

Information processing unit 401 reads, after it confirms to modem control unit 406 that the negotiation has completed at step S1505, the "access request identifier" from storage unit 408, and writes the "access request identifier" to the output buffer of modem control unit 406. Consequently, modem control unit 406 transmits the character train written in the output buffer to client side modem 103. As a result, the "access request identifier" is transmitted from information processing unit 401 to the client side at step S1506.

Information processing unit 401 waits, after it transmits the access request identifier, for reception of the "identifier in response to the access request" from the client side at step S1507.

If the "identifier in response to the access request" is received, then information processing unit 401 reads out the "identifier acknowledging receipt of the response to the access request" from storage unit 408 and writes "identifier acknowledging receipt of the response to the access request" into the output buffer or modem control unit 406. Consequently, modem control unit 406 transmits the character train written in the output buffer to modem 103. As a result, the "identifier acknowledging receipt of the response to the access request" is transmitted from information processing unit 401 to the client side at step S1508.

After the "identifier acknowledging receipt of the response to the access request" is transmitted, information processing unit 401 renders telephone disconnecting unit 405 operative. Consequently, telephone disconnecting unit 405 instructs external modem 104 to perform an on-hook operation through modem control unit 406. As a result of this processing, information processing unit 401 instructs modem 104 to perform an on-hook operation at step S1509 and instructs modem 103 to disconnect the line.

By the sequence of processes described above, the access request issuing processing to client 101 for acceptance of electronic mail by server 102 is ended at step S1510.

Even after the sequence of processes is ended, if a trigger for reception is reported at step S1501 from the mail reception process described above, then server 102 performs processing similar to that described above.

Here, client 101 of the destination to which the access request has been issued by server 102 subsequently performs dial up connection processing to server 102. However, the processing of server 102 for undergoing the dial up connection processing is performed by another process according to the prior art such as PPP connection. This is not particularly described herein because it falls outside of the scope of the present invention.

Figure 14:
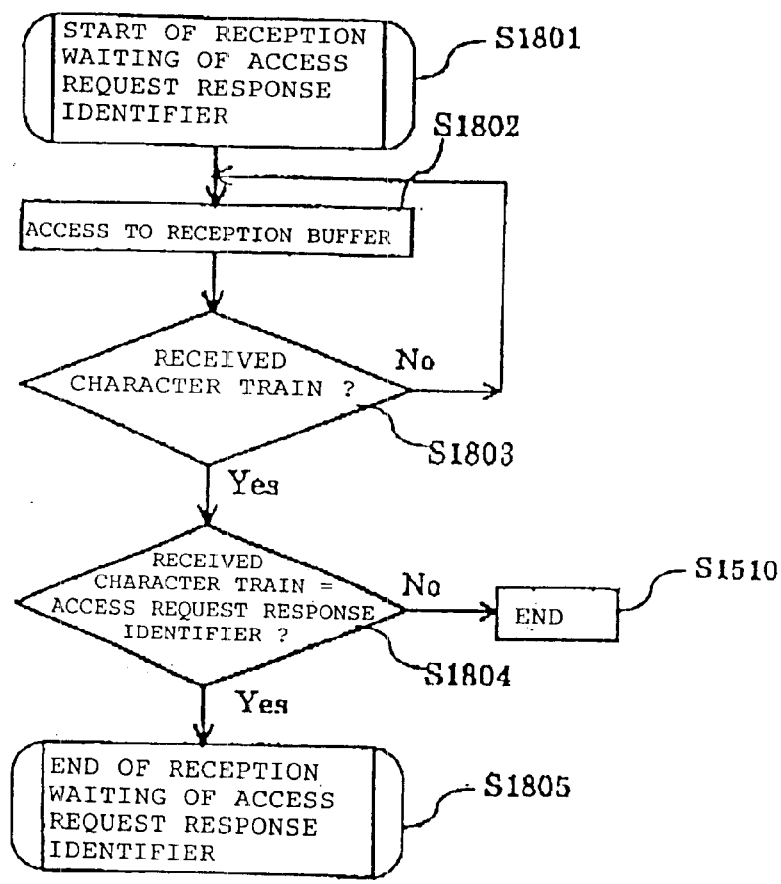
FIG. 14 is a view particularly showing the flow of the processing of waiting for an access request response identifier illustrated in FIG. 13.

FIG. 14 is a view particularly showing the flow of the processing of waiting for the access request response identifier illustrated in FIG. 13.

After reception waiting at step S1801 for the access request response identifier is started, information processing unit 401 refers to the input buffer of modem control unit 406 at step S1802.

Information processing unit 401 checks whether or not the buffer has a newly received character train therein at step S1803. If the buffer does not have a character train, then information processing unit 401 refers to the input buffer of modem control unit 406 again at step S1802.

If the input buffer has a received character train, then information processing unit 401 compares the character train with the "identifier in response to the access request" stored in advance in storage unit 408 at step S1804.

If a result of the comparison reveals in coincidence, then information processing unit 401 determines that no response for access request has been received from the client side, and ends the present process at step S1501. If the character train coincides with the "identifier in response to the access request", then information processing unit 401 completes the waiting at step S1507 processing for reception of the identifier in response to the access request at step S1805, and advances to next processing at step S1508.

Second Embodiment

Figure 15:
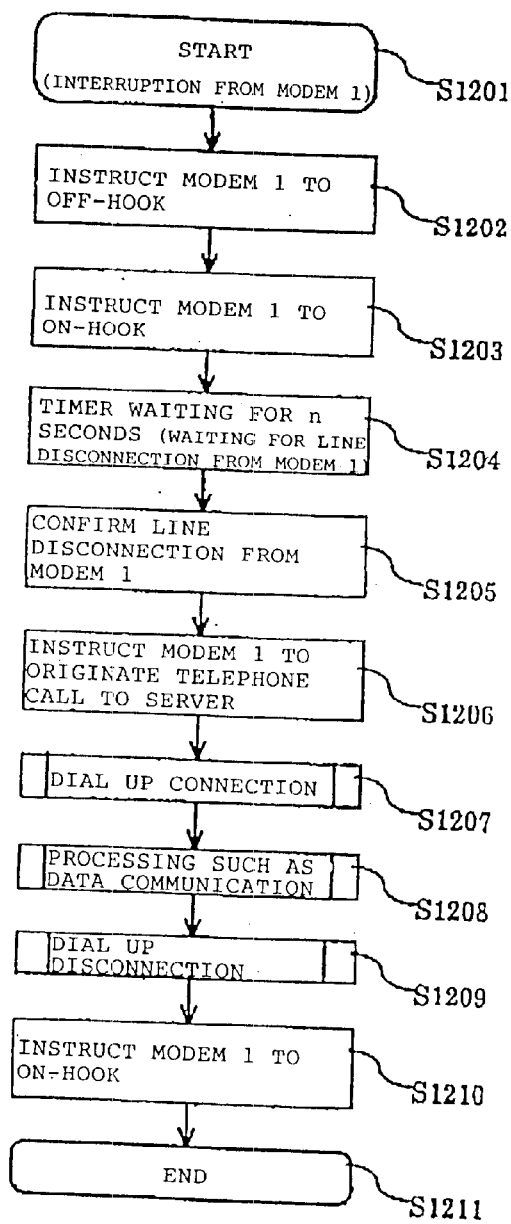
FIG. 15 is a flow chart for explaining a second embodiment of operation of the client shown in FIG. 2.

FIG. 15 is a flow chart for explaining a second embodiment of the operation of the client shown in FIG. 2.

The second embodiment is a simplified modification of the first embodiment and is a system wherein access request is performed without using the access request identifier. Steps S603 to S605 included in the operation (FIG. 8) of the first embodiment are omitted.

In the second embodiment, the "access request identifier" is not communicated, and instead, it is decided that, if a telephone call terminates at modem 103 on the client side (upon call termination), this is a terminating call from particular server 102 without fail. Thus, if a telephone call is terminated at client 101 at step S1201, then client 101 instructs modem 103 to perform an on-hook operation by the same method as in the first embodiment and then instructs modem 103 immediately to perform an off-hook operation at step S1203.

Processing following the processing at step S1204 of waiting for disconnection of the line in the second embodiment is similar to that in the first embodiment at steps S607 to S614.

Further, in the second embodiment, when an originating telephone number of the terminating call at modem 103 (the number of the apparatus which has originated the telephone call) can be recognized by client 101, since it can be specified that the terminating call originates from server 102 even if no "access request identifier" is communicated, the system according to the present invention can be realized. Also a flow of operation in this instance is the same as that illustrated in FIG. 15.

Figure 16:
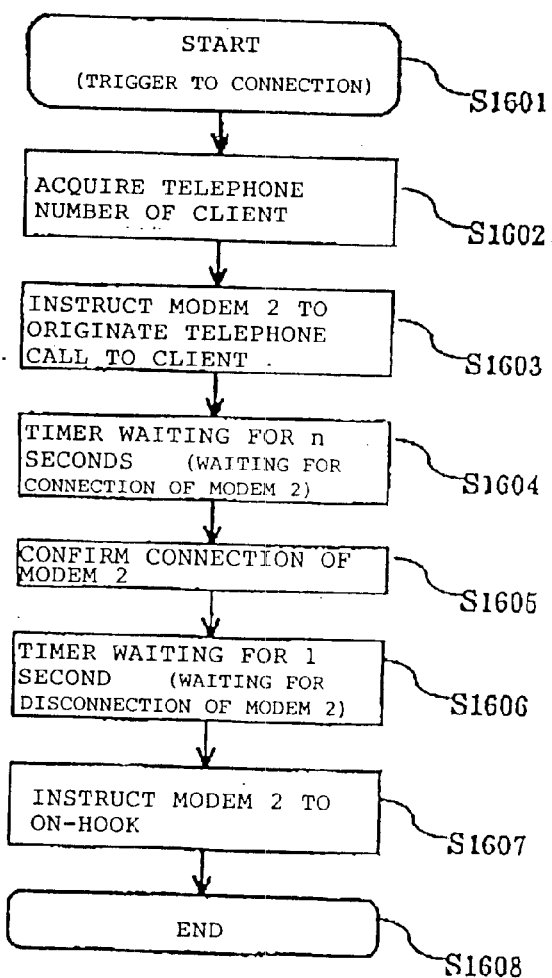
FIG. 16 is a flow chart for explaining a second embodiment of operation of the server shown in FIG. 2.

FIG. 16 is a flow chart for explaining the second embodiment of the operation of the server shown in FIG. 2. The second embodiment is a simplified modification of the first embodiment and is a method wherein access request is performed without using the access request identifier.

In the second embodiment, processing of, after operation of the present embodiment is started at step S1601, acquiring the telephone number "03-XXXX-1234" of client A at step S1602, instructing modem 104 to originate a telephone call to client A at step S1603, waiting for connection of modem 104 at step S1604 and confirming the connection of modem 104 at step S1605 is same as that in steps S1501 to S1505 included in the flow of processing of the server side of the first embodiment (FIG. 13).

The second embodiment is a modification of the first embodiment which is characterized in that communication of the "access request identifier" is not performed. Thus, after the modem connection is confirmed at step S1605, server 102 immediately instructs modem control unit 406 to disconnect the line at step S1607, whereafter it ends the process at step S1908. The method of instructing server 106 to disconnect the line at step S1607 is the same as the method of instructing modem 104 to disconnect the line described above in the first embodiment at step S1509.

By the sequence of processes described above, the access request issuing process of server 102 to client 101 for acceptance of electronic mail is ended at step S1608.

Even after the sequence of processes is ended, if a trigger for reception is reported from the mail reception process described above again at step S1601, then server 102 performs processing similar to that described above.

Here, client 101 of the destination to which the line is connected by server 102 subsequently performs dial up connection processing to server 102. However, processing of server 102 which undergoes the dial up connection processing is performed by a different process according to the prior art such as PPP connection. This is not particularly described here since this falls outside the scope of the present invention.

Third Embodiment

Figure 17:
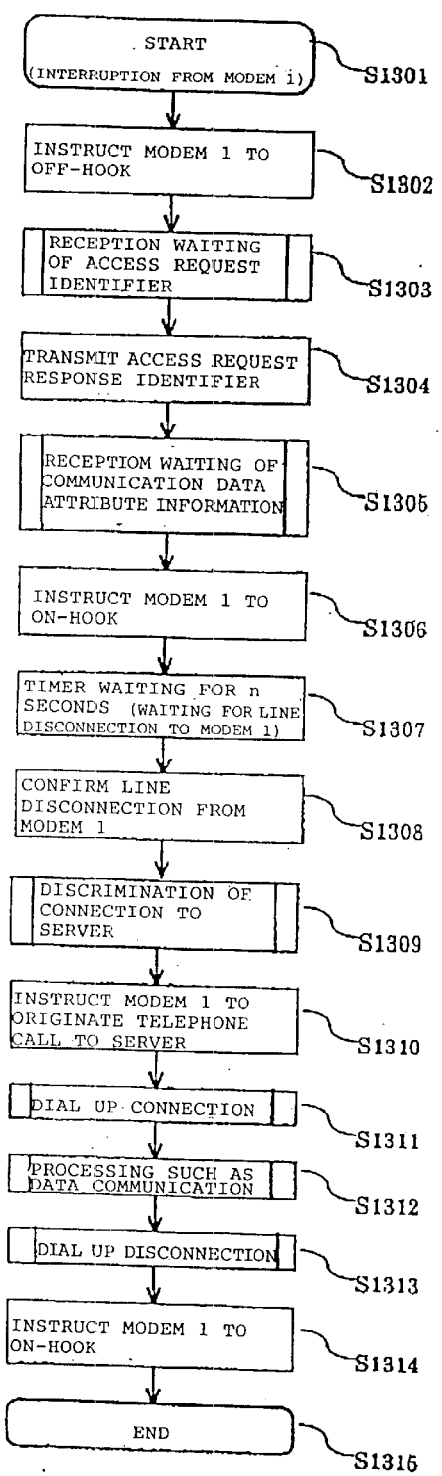
FIG. 17 is a flow chart for-explaining a third embodiment of operation of the client shown in FIG. 2.

FIG. 17 is a flow chart for explaining a third embodiment of the operation of the client shown in FIG. 2.

The third embodiment is a modification of the first embodiment with an additional function. In particular, in place of communication of the "identifier acknowledging receipt of the response to the access request", the "attribute information for communication of data" is communicated, and an operation of referring, before client 101 dial up connects, to the attribute for communication of data to discriminate whether or not client 101 should respond to the access request from server 102 is added. Here, it is a possible idea that, in place of client 101, a user refers to the attribute information for communication of data to discriminate whether or not it should respond to the access request from server 102, and an instruction of dial up connection is received through inputting unit 302 from the user.

In FIG. 17, after client 101 transmits the identifier in response to the access request at step S1304, it waits for reception of the attribute information for communication of data at step S1305.

In the present embodiment, the attribute information for communication of data includes the number of electronic mails to be received by client 101 and file sizes of items of the electronic mail, and only when client 101 discriminates that the attribute coincides with conditions recorded in advance at step S1309, it performs later dial up connection processing at steps S1310 to S1315 to accept the electronic mail data.

FIG. 5 is a flow chart illustrating a flow of waiting for reception of attribute information for communication of data and is a view particularly illustrating a flow of the waiting processing at step S1305 of the communication data attribute information of FIG. 17.

After waiting for reception of the attribute information for communication of data is started at step S1401, information processing unit 301 refers to the input buffer of modem control unit 306 at step S1402.

Information processing unit 301 checks whether or not the buffer has a newly received character train therein at step S1403, and if the buffer does not have a character train, then information processing unit 301 refers to the input buffer of modem control unit 306 again at step S1402.

If the input buffer has a newly received character train therein, then information processing unit 301 compares the character train with the "attribute information for communication of data" stored in advance in storage unit 307 at step S1404.

If a result of the comparison indicates in coincidence, then information processing unit 301 discriminates that there is some trouble in the communication with the server side and ends this process at step S1315.

If the character train coincides with the "attribute information for communication of data", then information processing unit 301 completes the waiting at step S1405 processing for reception of the attribute information for communication of data and advances to a next process at step S1306.

Figure 18:
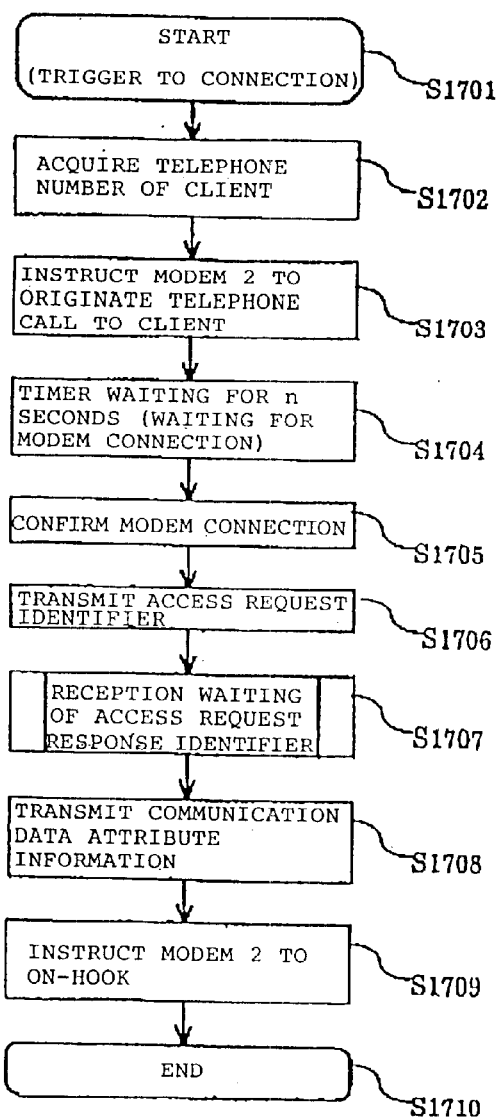
FIG. 18 is a flow chart illustrating a third embodiment of operation of the server shown in FIG. 2.

FIG. 18 is a flowchart illustrating the third embodiment of the operation of the server shown in FIG. 2.

The third embodiment is a modification of the first embodiment with an additional function and is characterized in that, in place of communication of the "identifier acknowledging receipt of the response to the access request", the "attribute information for communication of data" is communicated, an operation of referring to, before client 101 dial up connects, the attribute of communication data to discriminate whether or not it should respond to the access request from server 102.

In the third embodiment, processing of, after operation of the embodiment is started at step S1701, acquiring the telephone number "03-XXXX-1234" of client A at step S1702, instructing modem 104 to originate a telephone call to client A at step S1703, waiting for connection of modem 104 at step S1704, confirming the connection of modem 104 at step S1705, transmitting the access request identifier at step S1706, waiting for reception of the identifier in response to the access request at step S1707 and receiving the identifier in response to the access request is the same as that in steps S1501 to S1507 included in the flow of processing of the server side of the first embodiment (FIG. 13).

When information processing unit 401 receives the identifier in response to the access request at step S1707, it immediately transmits the "attribution information for communication of data" to the client side at step S1708. In the present embodiment, the attribute information for communication of data includes the number of electronic mail items to be received by client 101 and file sizes of the electronic mail. The attribute information is reported simultaneously when the reception process of the electronic mail described hereinabove reports a trigger for connection to the present process at step S1701, and the present process has been stored in storage unit 408.

Immediately after the "attribute information for communication of data" is transmitted to the client side at step S1708, information processing unit 401 instructs modem control unit 406 to disconnect the line at step S1709 and then ends the process at step S1710. The method of instructing modem control unit 406 to disconnect the line at step S1709 is same as the method of instructing a modem to perform an on-hook operation in the first embodiment at step S1509.

By the sequence of processes described above, the access request issuing process of server 102 to client 101 to accept electronic mail is ended at step S1710. Even after the sequence of processes is ended, if a trigger for reception is reported from the mail reception process described above again at step S1701, then server 102 performs processing similar to that described hereinabove.

Here, client 101, the destination to which the access request has been issued by server 102, performs dial up connection processing to server 102. However, processing by server 102 which undergoes the dial up connection processing is performed by another process according to the prior art such as PPP connection. This is not particularly described since this is outside the scope of the present invention.

As a fourth embodiment, the present invention can be applied as a connection system which copes with termination of a telephone call from server 102 of the first embodiment wherein, when server 201 originates a telephone call to client 101 at step S1503, if modem 103 of client 101 is busy because of a different object and cannot accept the call originated from server 201, then information processing unit 401 in server 102 can utilize timer 403 so that, after an arbitrary fixed time elapses, it can originate a telephone call again to modem 103 of client 101 again.

As a fifth embodiment, the present invention can be applied as a connection system which copes with termination of a telephone call from server 102 in the second embodiment wherein, when server 201 originates a telephone call to client 101 at step S1503, if modem 103 of client 101 is busy because of a different object and cannot accept the call originated from server 201, then information processing unit 401 in server 102 can utilize timer 403 so that, after an arbitrary fixed time elapses, it can originate a telephone call again to modem 103 of client 101 again.

As a sixth embodiment, the present invention can be applied as a connection system which copes with termination of a telephone call from server 102 in the third embodiment wherein, when server 201 originates a telephone call to client 101 at step S1503, if modem 103 of client 101 is busy because of a different object and cannot accept the call originated from server 201, then information processing unit 401 in server 102 can utilize timer 403 so that, after an arbitrary fixed time elapses, it can originate a telephone call again to modem 103 of client 101 again.

As a seventh embodiment, the present invention can be applied as a connection system which copes with termination of a telephone call from server 102 of the fourth embodiment wherein, when a plurality of access request processes to a plurality of clients are produced in a concentrated condition at a certain unit time in server 201 and cause such a condition like congestion, information processing unit 401 of server 102 can level apparatus resource load in the server. For example information processing unit 401 of server 102 arrange a processing sequence among the plurality of clients which are objects of its processing so that a call re-origination process to the same client may not become one-sided among the clients, and allocates a time till next call origination when an originating call to certain client A fails in connection to origination of a call to another client B.

As a eighth embodiment, the present invention can be applied as a connection system which copes with termination of a telephone call from server 102 of the fifth embodiment wherein, when a plurality of access request processes to a plurality of clients are produced in a concentrated condition at a certain unit time in server 201 and cause such a condition like congestion, information processing unit 401 of server 102 can level apparatus resource load in the server. For example information processing unit 401 of server 102 arrange a processing sequence among the plurality of clients which are objects of its processing so that a call re-origination process to the same client may not become one-sided among the clients, and allocates a time till next call origination when an originating call to certain client A fails in connection to origination of a call to another client B.

As a ninth embodiment, the present invention can be applied as a connection system which copes with termination of a telephone call from server 102 of the sixth embodiment wherein, when a plurality of access request processes to a plurality of clients are produced in a concentrated condition at a certain unit time in server 201 and cause such a condition like congestion, information processing unit 401 of server 102 can level apparatus resource loads in the server. For example information processing unit 401 of server 102 arranges a processing sequence among the plurality of clients which are objects of its processing so that a call re-origination process to the same client may not become one-sided among the clients, and allocates a time till next call origination when an originating call to certain client A fails in connection to origination of a call to another client B, and expands the time interval after which origination of a call to client A is repeated dynamically.

As a tenth embodiment, the present invention can be applied to a connection system which copes with termination of a telephone call from server 102 of the fourth embodiment wherein, when acceptance of electronic mail from a particular client stagnates or, because electronic mail terminating at a particular client is larger than that terminating at other clients, electronic mail to a plurality of clients stagnate in server 201 until apparatus resources such as a storage apparatus become tight, information processing unit 401 of server 102 can relieve occupation of storage apparatus at the server by setting the transmission frequency of the access request to client A higher than those to the other clients so as to increase the number of requests for acceptance of mail data to client A.

As an eleventh embodiment, the present invention can be applied to a connection system which copes with termination of a telephone call from server 102 of the fifth embodiment wherein, when acceptance of electronic mail from a particular client stagnates or, because electronic mail terminating at a particular client is larger than that terminating at the other clients, electronic mail to a plurality of clients stagnate in server 201 until apparatus resources such as a storage apparatus become tight, information processing unit 401 of server 102 can relieve occupation of storage apparatus at the server by setting the transmission frequency of the access request to client A higher than those to the other clients so as to increase the number of requests for acceptance of mail data to client A.

As a twelfth embodiment, the present invention can be applied to a connection system which copes with termination of a telephone call from server 102 of the sixth embodiment wherein, when acceptance of electronic mail from a particular client stagnates or, because electronic mail terminating at a particular client is larger than that terminating at the other clients, electronic mail to a plurality of clients stagnate in server 201 until apparatus resources such as a storage apparatus become tight, information processing unit 401 of server 102 can relieve the occupation of storage apparatus at the server by setting the transmission frequency of the access request to pertaining client A higher than those to the other clients so as to increase the number of requests for acceptance of mail data to client A.

Since the present invention has such a construction as described above, it exhibits the following effects.

(1) When a client/server system which employs the system of the present invention is used, since the access time to a server can be managed and allocated on the server side for each of registered clients, resource loads in the server can be leveled.

(2) When a client/server system which employs the system of the present invention is used, when processes requested from registered clients are completed on the server side, it becomes newly possible to report acceptance of results of the processes to the clients.

(3) When a client/server system which employs the system of the present invention is used, it becomes possible to request an access from the client again, in response to a trigger (arrival of a mail or the like) from the outside regarding a registered client.

(4) When a client/server system which employs the system of the present invention is used, it is possible to issue a request to accept a resource such as a file resource regarding registered client under the management of a server, thereby saving of resources in the server can be anticipated.

While preferred embodiments of the present invention have been described using specific terms, such description is for illustrative purposes only, and it is to be understood that changes and variations may be made without departing from the spirit or scope of the following claims.

What is claimed is:

1. A communication system comprising:
   a plurality of terminal units;
   a server that can connect to the plurality of said terminal units over a public network, the server being operative to initiate temporary communication with at least one of said terminal units and send a notification to that particular terminal unit when information destined for said particular terminal unit is available at the server; and
   an information processor at each said particular terminal unit operative to terminate the temporary communication between the server and the particular terminal unit after the temporary communication has been established and to reconnect the particular terminal unit to the server in response to said notification at a later time to download the available information.

2. The communication system defined in claim 1, wherein the information processor is operative to generate and send an identifier to the server after the temporary communication has been established.

3. The communication system defined in claim 1, wherein the server transmits attribute information for the available information destined for the particular terminal unit during the temporary communication, the attribute information being used as a trigger for performing further connection by the information processor of the particular terminal unit to the server.

4. The communication system defined in claim 3, wherein the information processor stores an arbitrary condition unique to the particular terminal unit and is operative to compare contents of the attribute information with the stored arbitrary condition to reconnect the particular terminal and server in response to a positive match.

5. The communication system defined in claim 1, wherein the server respectively transfers a transmission request to a particular terminal unit which triggers the temporary communication if an original transmission request has failed, the transmission requests being repeated during a predetermined time interval.

6. The communication system defined in claim 1, wherein each of the plurality of terminal units is contacted by the server on a uniform time basis.

7. The communication system defined in claim 5, wherein the transmission request from the server of the plurality of terminal units is repeated at frequencies which are adjusted to satisfy a condition determined in advance.

8. The communication system defined in claim 1, wherein the later time is predetermined.

9. A communication system comprising:
   a plurality of terminal units; and
   a server that can connect to each of the plurality of said terminal units over a public network, the server being operative to initiate temporary communication with a selected terminal unit to send a notification that information destined for the selected terminal unit is available at the server, the notification including information as to a specified time for the selected terminal to reconnect to the server; and an information processor at each selected terminal unit operative to terminate the temporary communication between the server and the selected terminal unit after the temporary communication has been established and to reconnect the selected terminal unit to the server in response to said notification at the specified time to download the available information.

10. The communication system defined in claim 9, wherein the information processor is operative to generate and send an identifier to the server after the temporary communication has been established.

11. The communication system defined in claim 9, wherein the server transmits attribute information for the available information destined for the selected terminal unit during the temporary communication, the attribute information being used as a trigger for performing further connection by the information processor of the selected terminal unit to the server.

12. The communication system defined in claim 11, wherein the information processor stores an arbitrary condition unique to the selected terminal unit and is operative to compare contents of the attribute information with the stored arbitrary condition to reconnect the selected terminal and server in response to a positive match.

13. The communication system defined in claim 9, wherein the server repetitively transfers a transmission request to a selected terminal unit which triggers the temporary communication if an original transmission request has failed, the transmission requests being repeated during a predetermined time interval.

14. The communication system defined in claim 9, wherein each of the plurality of terminal units is contacted by the server on an uniform time basis.

15. The communication system defined in claim 14, wherein the transmission request from the server of the plurality of terminal units is repeated at frequencies which are adjusted to satisfy a condition determined in advance.

16. The communication system defined in claim 9, wherein the later time is predetermined.

* * * * *